United States Patent [19]

Hoffman

[11] Patent Number: 4,569,422
[45] Date of Patent: Feb. 11, 1986

[54] STIFF LEG ATTACHMENT FOR WRECKER

[76] Inventor: Frederick M. Hoffman, 600 Holgate Ave., Defiance, Ohio 43512

[21] Appl. No.: 532,987

[22] Filed: Sep. 16, 1983

[51] Int. Cl.$^4$ ................................................. B60S 9/10
[52] U.S. Cl. ...................................... 188/7; 280/764.1
[58] Field of Search ............... 188/5, 6, 7; 280/763.1, 280/764.1, 765.1, 766.1; 254/418, 421, 422, 423

[56] References Cited

U.S. PATENT DOCUMENTS

| | | | |
|---|---|---|---|
| 1,116,235 | 11/1914 | Brown | 188/5 |
| 1,625,226 | 4/1927 | Simmons | 188/5 |
| 2,695,682 | 11/1954 | Ehlinger | 188/5 |
| 2,775,314 | 12/1956 | Hiemstra | 188/5 |

FOREIGN PATENT DOCUMENTS 315848  7/1928  United Kingdom .

Primary Examiner—Duane A. Reger
Attorney, Agent, or Firm—Harvey B. Jacobson

[57] ABSTRACT

Apparatus for resisting rearward movement of a tow truck or wrecker while winching a vehicle up to towing position in back of the wrecker comprises a stiff leg attachment which is raised and lowered by toggle linkages that move overcenter and engage against a stop to support the stiff leg attachment in lowered position during winching.

11 Claims, 3 Drawing Figures

4,569,422

STIFF LEG ATTACHMENT FOR WRECKER

BACKGROUND OF THE INVENTION

This invention relates to vehicles known as tow trucks or wreckers which are used for towing disabled automobiles and the like.

Wreckers generally are provided with winching equipment including a boom and winching cable used to winch a disabled automobile up into towing position immediately behind the wrecker.

During winching, it is necessary to immobilize the wrecker against rearward movement, and different means have been proposed for this purpose. Included among such means are so-called scotch blocks which are ramp-like members positioned, in use, under the rear wheels of the wrecker and attached to the rear bumper structure of the wrecker by chains. With this arrangement, during winching, a tension force is developed in the chains resisting rearward movement of the wrecker, but also exerting a force on the bumper structure which may tend to buckle the structure. An alternative to the use of scotch blocks is the provision of a "stiff leg" on the wrecker including a support linkage terminating in a braced foot which is lowered into ground engagement at the rear of the wrecker to resist rearward movement. The present invention provides an improved stiff leg attachment of this nature.

STATEMENT OF PRIOR ART

Applicant acknowledges the following U.S. patents relating generally to vehicles having ground-engaging force-resisting and like devices:

U.S. Pat. No. 1,221,612
U.S. Pat. No. 1,521,705
U.S. Pat. No. 1,266,238
U.S. Pat. No. 2,747,692
U.S. Pat. No. 2,781,927
U.S. Pat. No. 2,847,092
U.S. Pat. No. 2,886,139
U.S. Pat. No. 3,112,641
U.S. Pat. No. 3,322,396
U.S. Pat. No. 4,304,519

SUMMARY OF THE INVENTION

In accordance with the invention, apparatus for preventing rearward movement of a wrecker during winching comprises a stiff leg device with a ground-engageable foot adapted to be supported on mounting means at the rear of a wrecker for pivotal movement between a raised inoperative position, and a lowered operative position wherein the foot is in ground engagement, and toggle means connected between the stiff leg device and the mounting means for moving the stiff leg between said positions when operated upon by suitable actuating means, and for supporting the stiff leg in operative position during winching. Preferably, the toggle means has a folded configuration wherein the stiff leg is in the raised inoperative position and an unfolded configuration wherein the stiff leg is in the lowered operative position, the toggle means being moved overcenter from the folded configuration to the unfolded configuration and engaging against a stop in the unfolded configuration providing support for the stiff leg.

By operating the toggle means overcenter as described above, and causing it to engage against a stop, during winching all loads are effectively removed from the toggle actuating means (which may for example comprise a pneumatic or hydraulic ram or screw, or alternatively may comprise the winching cable itself). Further, because of the force magnification of a toggle, as it nears its straightened configuration, the present arrangement can be operated by smaller actuating means than are required for known stiff leg-type devices.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENT

The drawings illustrate apparatus, generally indicated at 10, which may be attached at the rear of a wrecker 12 for use in resisting rearward movement of the wrecker while the wrecker is being used to winch a broken-down automobile or the like up into towing position immediately behind the wrecker. It is to be understood that the apparatus 10 may be applied to existing wreckers or may be built into newly manufactured wreckers.

Figure 1:
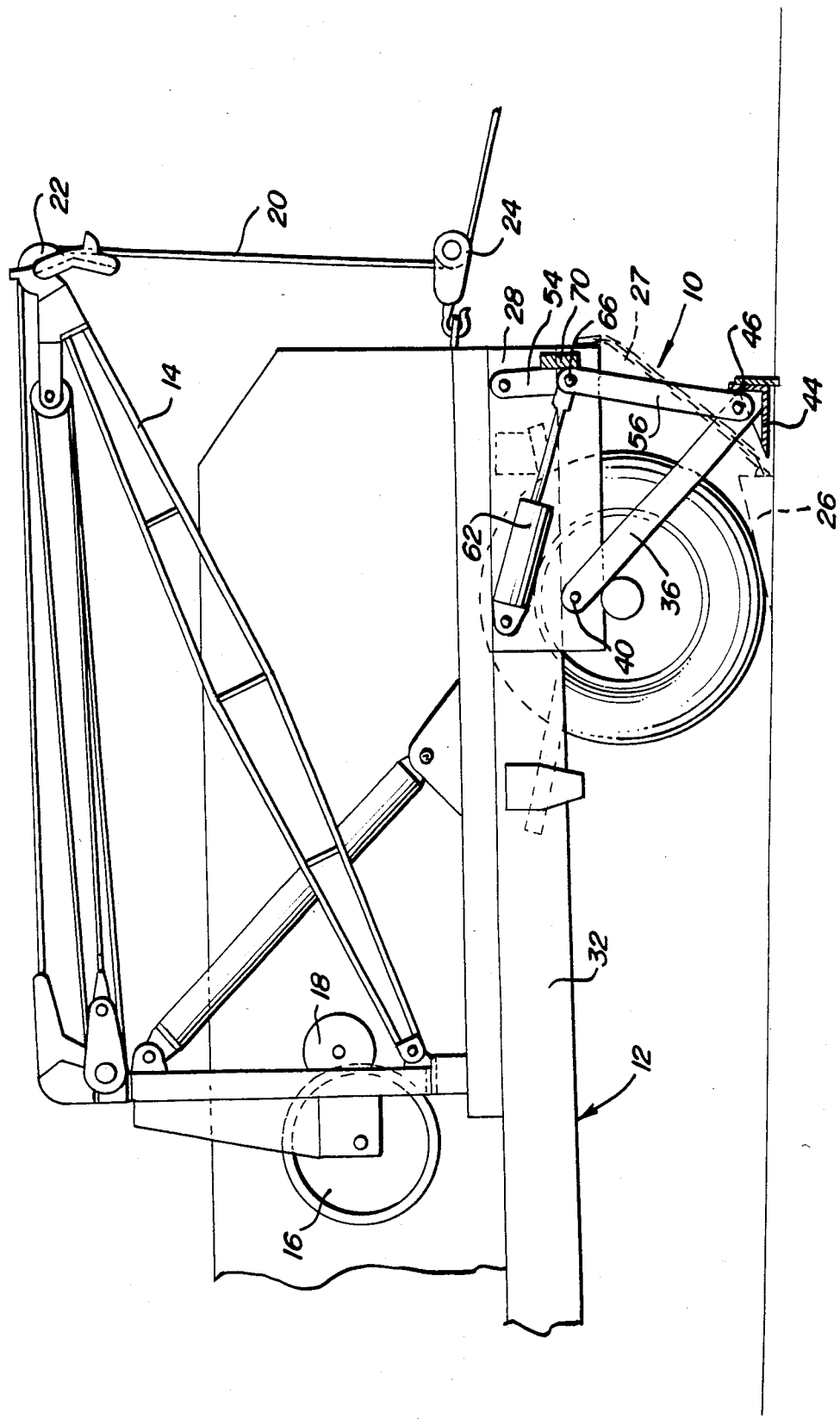
FIG. 1 is a semi-diagrammatic side elevational view of the rear part of a wrecker fitted with a stiff leg attachment in accordance with the invention.

As shown in FIG. 1, the wrecker may be equipped with the customary boom 14, winching drums 16, winch motor 18, and winching cable 20 which, in use, may be passed in known manner from head pulleys 22 of the boom around snatch block pulleys 24 secured to the rear of the wrecker, to a towing pulley (not shown) attached by a hook or the like to an automobile to be towed. During winching of the automobile up into towing position, means should be provided to resist rearward movement of the wrecker. Such means may, for example, comprise scotch blocks 26, shown in phantom in FIG. 1, which are placed under the rear wheels of the wrecker, and are attached by chains 27 to the rear bumper structure of the wrecker. During winching, however, tension developed in the chains can cause buckling of the bumper structure. As an alternative to scotch blocks, the present invention accordingly provides the subject stiff leg attachment.

Attachment 10 includes a pair of mounting plates 28, 30 which may be suitably welded along opposite side members 32, 34 of the wrecker frame to provide mounting means for respective left and right hand stiff leg members 36, 38 pivotally attached to the respective plates by suitable pivot connections 40, 42. The free ends of members 36, 38 are welded to a common transversely extending elongate ground-engageable foot 44 having toothed plates 46, 48 for biting into a ground surface.

Pivotally connected between the respective plates 28, 30 and the distal ends of members 36, 38 are toggle linkages comprising pairs of pivotal links 54, 56 and 58, 60 respectively. Actuating hydraulic (or pneumatic) rams 62, 64 are pivotally connected between plates 28, 30 and the elbow joints 66, 68 of the respective toggle linkages. Suitable hydraulics (or pneumatics) not shown, is provided for extending and retracting the rams. A transverse bar 70 extends between plates 28 and 30 to form a stop, as will be described, for the toggle linkages.

Figure 2:
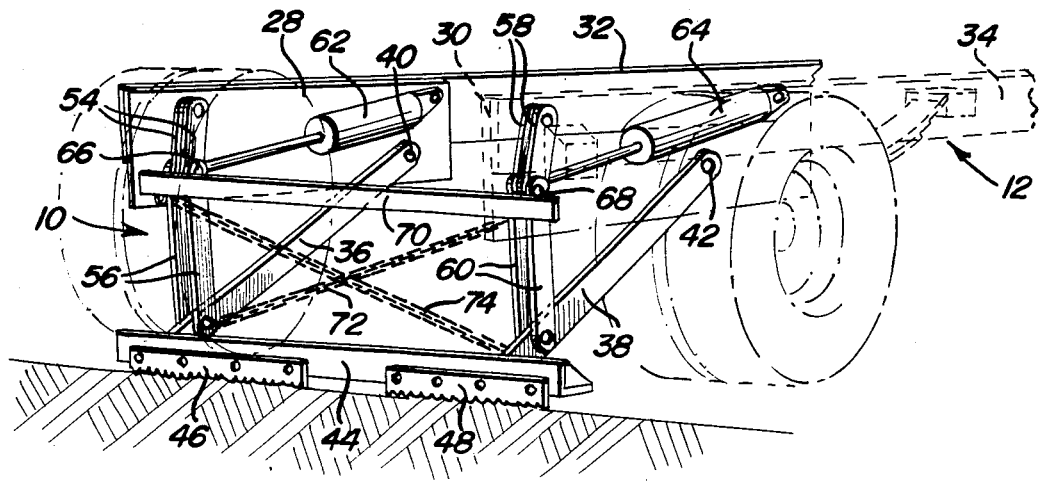
FIG. 2 is a perspective view of the attachment in a lowered operative position.
Figure 3:
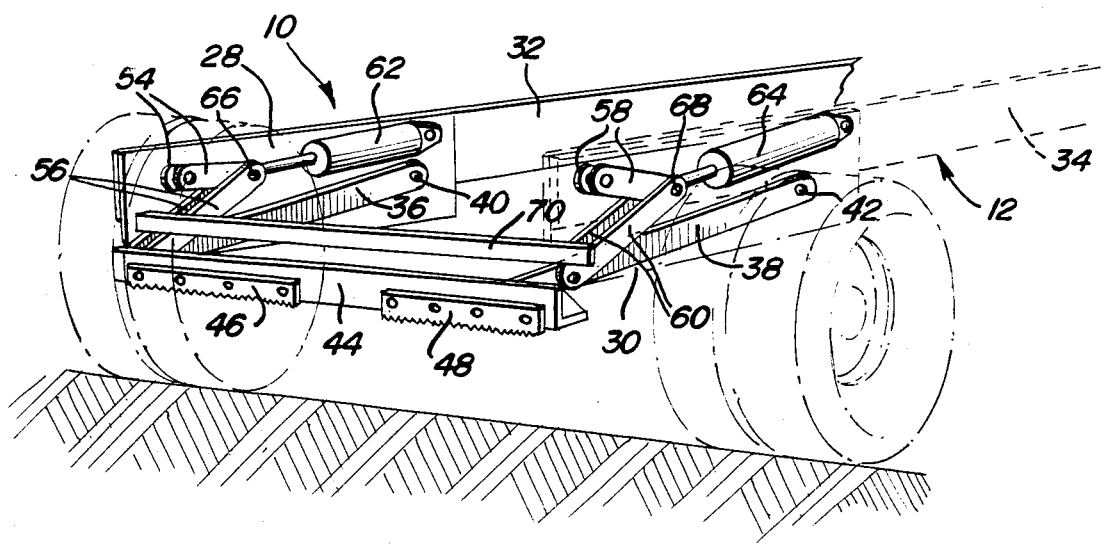
FIG. 3 is a perspective view of the attachment in a raised inoperative position.

When rams 62, 64 are retracted, the toggle linkages are folded, as shown in FIG. 3, and the stiff leg attachment is in elevated inoperative position. When the wrecker is to be used for winching, the rams are extended, thereby unfolding the toggle linkages and moving members 36, 38 down so that transverse foot 44 engages the ground. The configuration of the toggle linkages is such that continued extension of the rams causes the linkages to move overcenter until the elbow regions of the respective linkages engage against the transverse bar 70. In this condition, shown in FIGS. 1 and 2, forces tending to move the wrecker rearwardly during winching are resisted by the stiff leg members 36, 38 and bar 70 which effectively supports the stiff leg members through the toggle linkages. The overcenter configuration of the linkages and their engagement against bar 70 effectively relieve the actuating rams of any load during winching. After winching, the device may be raised by retracting the rams.

Cross chains 72, 74 may be provided between the respective stiff leg and toggle elements, to provide bracing when winching loads that are not directly behind the wrecker.

Use of the invention in place of scotch blocks effectively eliminates the problem of rear bumper damage, which may be caused by tension developed in scotch block attachment chains. It also eliminates the need for storage space for scotch blocks, and avoids wasted time in positioning and then removing scotch blocks. Also, the contact point with the ground is moved back compared with that when scotch blocks are used, thereby increasing the pulling capacity of a wrecker. Further, because the components of the subject device are mounted on side plates extending along the wrecker frame, the forces caused by heavy pulling or lifting are distributed, thereby reducing the possibility of damage to the wrecker.

While in the illustrated embodiment the actuating means for folding and unfolding the toggle linkages comprise hydraulic (or pneumatic) rams, other actuating means may be used. For example, the winch cable, wound around a suitably placed pulley, may itself be used to extend the linkages and set the stiff leg members, and the toggles may then be released by a bar and the foot raised and secured in place by the winch cable.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Apparatus for resisting rearward movement of a wrecker during winching of a load, such as a disabled automobile, into towing position behind the wrecker, the apparatus comprising stiff leg means having a ground-engageable foot, mounting means securing the stiff leg means on a frame portion at the rear of a wrecker, means securing the stiff leg means on the mounting means for pivotal movement of the stiff leg means between a raised inoperative position and a lowered operative position wherein the foot is in ground engagement, toggle means pivotally connected between the mounting means and stiff leg means for moving the stiff leg means between said positions in response to folding and unfolding movements of the toggle means and for supporting the stiff leg means in operative position during winching, and actuating means for folding and unfolding the toggle means, the apparatus including stop means attached to the mounting means behind the toggle means for engaging the toggle means when the toggle means is in unfolded configuration and the stiff leg means is in the operative position, the toggle means being in folded configuration when the stiff leg means is in the inoperative position and being moved overcenter from said configuration, wherein the toggle means includes a pair of toggle links connected between the mounting means and the stiff leg means, with an elbow connection between said links, the toggle means being adapted to engage the stop means in the region of the elbow connection and wherein the actuating means comprises extendible and retractable fluid pressure-operated means connected between the mounting means and the elbow connection of the toggle means.

2. The invention of claim 1 wherein the mounting means comprises left and right hand mounting plates for opposite sides of a wrecker frame respectively, the stiff leg means comprising left and right hand stiff leg members pivotally attached to the respective mounting plates, and the toggle means comprising left and right hand toggle linkages connected between the respective plates and stiff leg members.

3. The invention of claim 2 wherein said foot comprises an elongated transversely extending member connected to both of said stiff leg members.

4. The invention of claim 3 wherein the foot includes toothed means associated with said transverse member for biting into the ground.

5. The invention of claim 2 wherein each toggle linkage comprises a pair of toggle links connected between the respective mounting plate and stiff leg member with an elbow connection between said links, the toggle linkage being adapted to engage said stop means in the region of the elbow connection.

6. The invention of claim 5 wherein the actuating means comprises fluid pressure-operated rams connected between the respective mounting plates and the elbow connections of the respective toggle linkages.

7. The invention of claim 2 wherein the stop means comprises a transverse bar extending between said mounting plates.

8. Apparatus for resisting rearward movement of a wrecker during winching of a load into towing position behind the wrecker, the apparatus comprising left and right hand mounting plates for suspending left and right hand stiff leg members on a frame portion at the rear of the wrecker, left and right hand stiff leg members pivotally connected to the respective mounting plates, a transverse elongate ground-engageable foot connected to both of said stiff leg members, left and right hand toggle linkages connected between the respective mounting plates and stiff leg members for raising and lowering the stiff leg members by folding and unfolding movements of the toggle linkages and for supporting the stiff leg members in lowered position with the foot in ground engagement to resist rearward movement of the wrecker, and actuating means for folding and unfolding the toggles linkages, wherein the toggle linkages have a folded configuration wherein the stiff leg members are in raised position, and an unfolded configuration wherein the stiff leg members are in lowered position with the foot in ground-engaging position, the linkages moving overcenter from the folded configuration to the unfolded configuration, and the apparatus including stop means attached to the mounting plates behind the toggle linkages for engaging the toggle linkages in the unfolded configuration and supporting the stiff leg members in operative position for winching.

9. The invention of claim 8 wherein the stop means comprises an elongate transverse bar extending between the respective mounting plates.

10. The invention of claim 9 including means for cross bracing the respective stiff leg members and toggle linkages when winching loads which are not positioned directly behind a wrecker.

11. The invention as defined in claim 10 wherein the cross bracing means comprises chains extending between the respective stiff leg members and toggle linkages.

* * * * *